US007409712B1

(12) United States Patent
Brooks et al.

(10) Patent No.: US 7,409,712 B1
(45) Date of Patent: Aug. 5, 2008

(54) METHODS AND APPARATUS FOR NETWORK MESSAGE TRAFFIC REDIRECTION

(75) Inventors: Roy M. Brooks, New Hill, NC (US); John E. Cavanaugh, Raleigh, NC (US); Paul M. Quinn, Brookline, MA (US)

(73) Assignee: Cisco Technology, Inc., San Jose, CA (US)

( * ) Notice: Subject to any disclaimer, the term of this patent is extended or adjusted under 35 U.S.C. 154(b) by 722 days.

(21) Appl. No.: 10/620,981

(22) Filed: Jul. 16, 2003

(51) Int. Cl.
*G06F 11/00* (2006.01)
(52) U.S. Cl. ............... 726/22; 726/11; 726/13; 726/14; 726/15; 726/23; 726/24; 726/25; 726/26; 713/188
(58) Field of Classification Search .......... 726/11, 726/22–26, 13–15; 713/188; 709/223–229, 709/238–244; 370/229–230.1
See application file for complete search history.

(56) References Cited

U.S. PATENT DOCUMENTS

| 6,704,873 | B1 * | 3/2004 | Underwood ............... 726/12 |
| 6,993,660 | B1 * | 1/2006 | Libenzi et al. ............ 713/188 |
| 2002/0083175 | A1 * | 6/2002 | Afek et al. .............. 709/225 |
| 2002/0133586 | A1 * | 9/2002 | Shanklin et al. .......... 709/224 |
| 2003/0110379 | A1 * | 6/2003 | Ylonen et al. ............ 713/164 |
| 2003/0188189 | A1 * | 10/2003 | Desai et al. ............ 713/201 |
| 2003/0204621 | A1 * | 10/2003 | Poletto et al. ........... 709/239 |
| 2004/0010712 | A1 * | 1/2004 | Hui et al. .............. 713/201 |

\* cited by examiner

*Primary Examiner*—Kimyen Vu
*Assistant Examiner*—Baotran N To
(74) *Attorney, Agent, or Firm*—Chapin IP Law, LLC; Barry W. Chapin, Esq.

(57) ABSTRACT

Conventional methods of addressing a Distributed Denial of Service attack include taking the target node offline, and routing all traffic to an alternate countermeasure, or "sinkhole" router, therefore requiring substantial lag time to reconfigure the target router into the network. In a network, a system operator monitors a network for undesirable message traffic. Upon a notification of such undesirable message traffic, traffic is rerouted to a filter complex to separate undesirable traffic. The filter complex establishes an alternate route using a second communications protocol, and uses the alternate route to redirect the desirable message traffic to the target node. The use of the second protocol avoids conflict between the redirected desirable traffic and the original, or first, protocol which now performs the reroute. In this manner, the filter complex employs a second alternate communications protocol to reroute and redirect desirable message traffic to the target node while diverting undesirable message traffic, and therefore avoids widespread routing configuration changes by limiting the propagation breadth of the second protocol.

36 Claims, 7 Drawing Sheets

METHODS AND APPARATUS FOR NETWORK MESSAGE TRAFFIC REDIRECTION

BACKGROUND OF THE INVENTION

Computer networks transport a large volume of message traffic between users. The network interconnects the users by way of routing devices and physical communication lines. The routing devices switch message traffic between users by address information in the message traffic which conforms to a particular protocol. The message traffic travels in a series of "hops" among the routing devices conversant in the protocol to arrive at the destination, or target node.

In such a computer network, certain activities may cause an influx of an inordinate amount of message traffic to particular target node. Malicious, intentional inundation of messages to a particular target node overwhelm the resources of the target node to process the barrage of incoming message traffic. This so called "denial of service" attack results in the inability of the target node to provide routing service to users due to the consumption of resources by the undesirable incoming message traffic. Such denial of service attack attempts may be made by disgruntled employees, hackers, pranksters, and others for a variety of reasons. Further, such attacks also occur unintentionally due to unfamiliarity or ignorance, for example, an employee erroneously addressing an email to an entire company mailing list with delivery confirmation.

Such conventional computer networks employ a plurality of routing devices. The routing devices include edge routers, which communicate directly with the user nodes, or hosts/servers, and core routers, which communicate with other routing devices in the computer network. Each of the edge routers and core routers (routing devices) has one or more routing tables for routing message traffic according to address information in each of the messages included in the message traffic. The routing devices lookup the address information in the routing tables to determine where to send, or route, the message.

In a conventional computer network, the information in the routing table propagates between the routing devices so that each routing device will know where to forward a particular message for the next "hop." An edge router nearest a particular host advertises itself as the preferred routing device for that host. Other routers will store information in their routing tables indicating that message traffic for the host is to be sent to the preferred routing device. The edge router serving the host, therefore, becomes the focal point for the denial of service attack on the host.

SUMMARY

Conventional countermeasures for defending against denial of service attacks include analyzing the incoming message traffic to determine the source. An inordinate quantity of transmissions from a particular, unknown source is often indicative of such improper transmissions. In such a scenario, the solution is to isolate the messages emanating from the offending source. However, a particularly malicious hacker or other scenario causes in the inundating message traffic to emanate from a plurality of sources. For example, a virus disseminates via an email to a rather large distribution list. Upon opening the email, the virus results in a transmission sent from the email recipient to the target node. Since all the recipients unknowingly cause a transmission back to the same target node, the target node receives an inordinate amount of messages, each from a different source. None of the senders may be aware that they are, in effect, participating in a denial of service attack, as they simply opened an email, and since each email emanates once from each remote node, the target node observes no inordinate pattern of transmission from a single remote source. Such an attack is called a Distributed Denial of Service attack (DDOS), since it emanates from a plurality of distributed sources.

Conventional methods of addressing a DDOS attack include removing the victim target node from the routing tables of the network configuration by taking the target node offline. A system operator then reroutes message traffic to a countermeasure destination by replacing the target node address with the countermeasure, or "sinkhole" router node address such that the countermeasure destination, typically another node, receives all message traffic for analysis.

Once the system or network administrator diagnoses and finds the offending source or sources and corrects the DDOS attack condition, the administrator reconfigures the target node back into the network by replacing the countermeasure destination with the target node, reversing the conventional DDOS approach. However, reconfiguration with the original target node is subject to a time lag, depending on the breadth of the target node's user base. Intervening message traffic may be lost during the downtime of the victim target node.

Unfortunately, there are such drawbacks associated with the above described conventional recovery techniques for inundating or excessive message delivery, such as brought about by distributed denial of service (DDOS) attacks. If the affected target node, or host, is taken offline, it will typically require approximately between 4 to 36 hours to repropagate the new name to network address binding and corresponding preferred route across the network. Further, in this instance, a malicious DDOS attacker is at least somewhat successful, because the affected target node was taken offline, opening the window for lost message traffic.

Another conventional alternative is to collect the message traffic at the countermeasure router, separate the undesirable message traffic, and forward the desirable benign, or clean, message traffic to the target victim node without taking the affected node offline. However, this conventional approach requires a modification to each collected message and/or to routing information at each intermediate router between the sinkhole router and the edge router serving the host, since each conventional intermediate router needs to be reconfigured allow the desirable "clean" message traffic to pass.

It would be beneficial, therefore, to allow a system operator to defend against a DDOS attack by identifying a target node, or host, under attack, and assigning a filter complex to intercept and filter all message traffic originally sent to the target node, and without taking the target node offline or modifying numerous routing devices between the filter complex and the target node. The filter complex separates desirable, or clean, message traffic from the undesirable, or bad, message traffic and forwards the desirable message traffic onto the target node without burdening the target node with the voluminous undesirable traffic and without taking the target node offline or otherwise requiring time consuming reconfiguration to occur.

The present invention substantially overcomes the drawbacks associated with the above described conventional reroute of undesirable message traffic. In a computer network system suitable for use with the invention claimed herein, a system operator monitors a network for undesirable message traffic. Upon a notification of such undesirable message traffic inundating a node, the system operator reroutes message traffic from the target node to a filter complex. The filter complex becomes the reroute destination temporarily replacing the target node, and propagates a network address according to a network protocol in use by the target node. A preferred target router formerly serving the target node also receives notification that it (the former preferred target router) is no longer the preferred router for the target node, and likewise propagates such routing information to other nodes in communication via the network protocol. The filter complex filters the message traffic to separate desirable "clean" message traffic from undesirable "bad" message traffic, and may discard or analyze the latter.

The filter complex establishes an alternate route using a second communications protocol or transport mechanism different from the protocol used to redirect message traffic to the filter complex, and uses the alternate route to redirect the desirable message traffic from the filter complex to the target node. The use of the second protocol avoids conflict between the redirected desirable traffic and the original, or first, protocol (transport mechanism) which now performs the reroute. In this manner, the filter complex employs a second, alternate, transport mechanism to reroute and redirect desirable message traffic to the target node while preventing undesirable message traffic due to a DDOS attack or other inundating sources from reaching the target node. The system employs the second, alternate transport mechanism protocol by reconfiguring routing information only at the preferred target node edge router and the filter complex, and avoids reconfiguring every intermediate router between the filter complex and the target node.

The second, alternate routing mechanism may, in particular arrangements, be a virtual private network (VPN) having a separate set of routing tables in an overlay arrangement with the first, primary network protocol under which the rerouting to the filter complex occurs. In such an arrangement, the routing devices operate (i.e. are conversant) in both the first, or primary protocol and in the second, VPN protocol. Such routing devices may be MPLS (Multi-Protocol Layer Service) routing devices, marketed commercially by Cisco Systems, Inc. of San Jose, Calif. The MPLS devices allow the same physical network for both the first and second protocols. In conjunction with the invention, the second transport protocol operates as an MPLS shunt, using a predefined or dynamic Virtual Routing or Forwarding table, to reach the target node. Alternatively, the second protocol follows a separate path on alternate lines and/or communication devices.

The system further provides directing the filter complex to filter the message traffic to subdivide desirable message traffic from undesirable message traffic. A security filter in the filter complex has filtering logic for performing filtering. The security filter identifies sequences in the message traffic indicative of undesirable message traffic. The filtering logic parses message content and identifies undesirable messages by content tags, keywords, token identification, or other suitable method.

In a particular configuration, the filter complex further includes a filter routing device in communication with other routing devices in the communications network and coupled to a filtering device operable to employ the security filter to analyze message traffic. Such a filter routing device is operable to communicate according to the first transport mechanism and the second transport mechanism.

In another particular configuration, a network management server is in communication with the filtering complex, and operable to send messages to direct the filter complex in rerouting and redirecting the message traffic.

The network management server operable to send a reroute message to the filtering complex. Such a reroute message is indicative of the filtering complex receiving message traffic in the first transport mechanism intended for the target node via the target node router serving the target node.

The network management server is further operable to communicate with a target node router serving the target node from the network management server, the network management server operable to send a redirect message to the target node router. Such a redirect message is indicative that the target router serving the target node is not to receive message traffic in the first transport mechanism corresponding to the target node. The redirect message is further indicative that the target node router serving the target node receives message traffic in the second transport mechanism corresponding to the target node.

In particular configurations, the first transport mechanism corresponds to a public access protocol adapted for communication via a plurality of dissimilar network switching devices, such as TCP/IP via the Internet. The second transport mechanism corresponds to a virtual private network operable to encapsulate message packets of dissimilar protocols such that the encapsulated message packets are recognized by a routing protocol of the virtual private network, and may also be TCP/IP based.

Rerouting includes propagating, via a standard protocol corresponding to the first transport mechanism, a node address other than the node address corresponding to the target node. Redirecting includes propagating routing information according to a predetermined protocol, the routing information operable to designate the target node as the destination of the message according to the second Transport mechanism. Such predetermined and standard protocols may be TCP/IP compliant, or may correspond to other transport mechanisms.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Configurations of the invention provide for countermeasures to undesirable message traffic such as that presented by DDOS (Distributed Denial of Service) attacks. In a computer network system suitable for use with the invention claimed herein, a system operator monitors a network for undesirable message traffic. Upon a notification of such undesirable message traffic inundating a node, the system operator reroutes message traffic from the target node to a filter complex. The filter complex becomes the reroute destination temporarily replacing the target node, and propagates a network address according to a network protocol in use by the target node. A preferred target router formerly serving the target node also receives notification that it (the former preferred target router) is no longer the preferred router for the target node, and likewise propagates such routing information to other nodes in communication via the network protocol. The filter complex filters the message traffic to separate desirable "clean" message traffic from undesirable "bad" message traffic, and may discard or analyze the latter.

The filter complex establishes an alternate route using a second transport mechanism different from the transport mechanism used to reroute message traffic to the filter complex, and uses the alternate, second transport mechanism to redirect the desirable message traffic from the filter complex to the target node. In this manner, the filter complex employs the second alternate transport mechanism to reroute and redirect desirable message traffic to the target node while preventing undesirable message traffic due to a DDOS attack or other inundating sources from reaching the target node. The system employs the second, alternate transport mechanism by reconfiguring routing information only at the preferred target node edge router and at the filter complex, and avoids reconfiguring every intermediate router between the filter complex and the target node over which the redirected message traffic passes.

The second, alternate transport mechanism may, in particular arrangements, be a virtual private network (VPN) having a separate set of routing tables in an overlay arrangement with the first, primary transport mechanism under which the rerouting to the filter complex occurs. In such an arrangement, the routing devices operate (i.e. are conversant) in both the first, or primary transport mechanism and in the second, VPN transport mechanism. Such routing devices may be, by way of example only, the MPLS (Multi-Protocol Layer Service) routing devices described above. The MPLS devices allow the same physical network for both the first and second protocols. Alternatively, the second protocol follows a separate path on alternate lines and/or communication devices.

Figure 1:
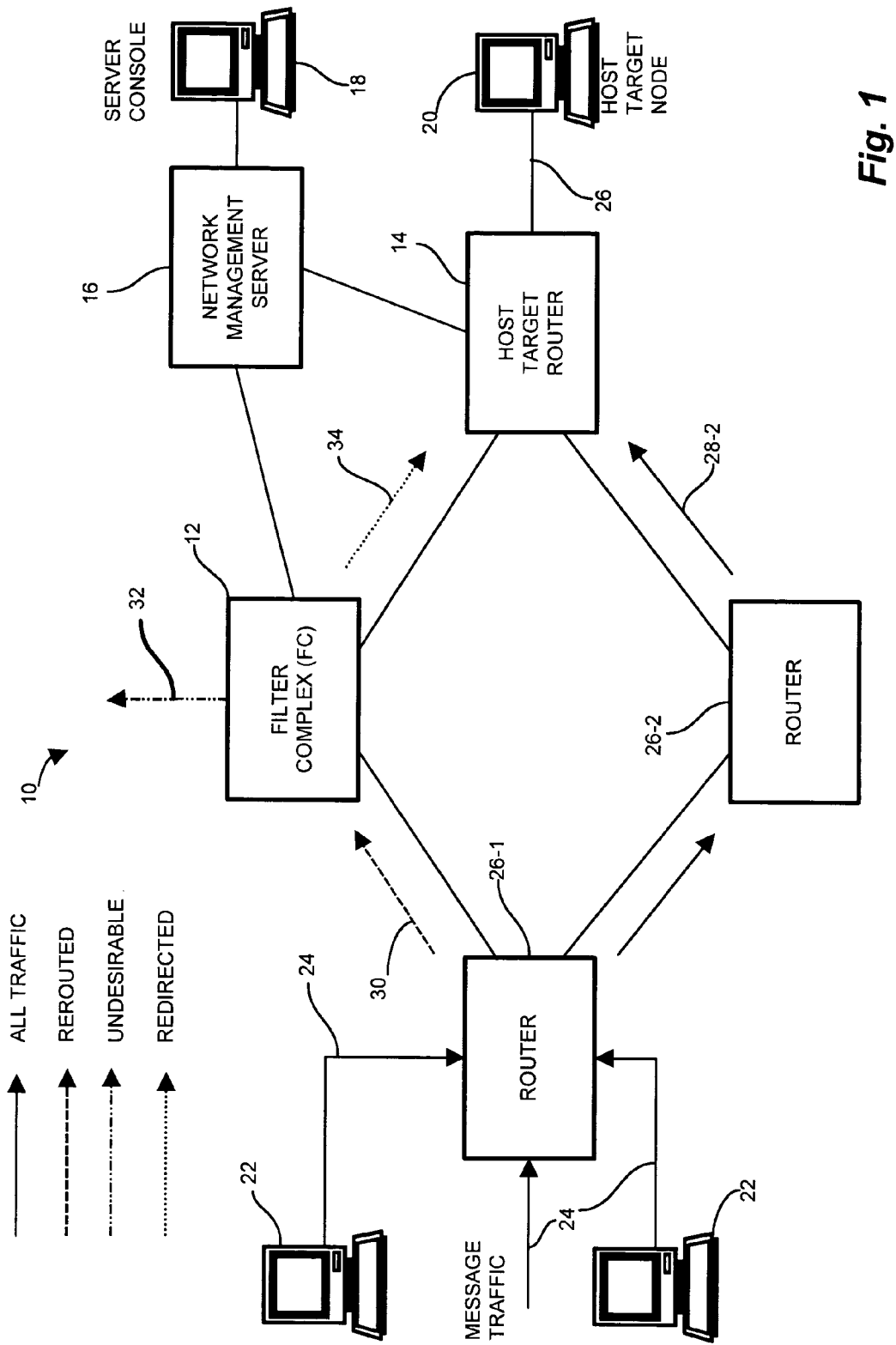
FIG. 1 is a context diagram of a communications system which is suitable for use with the present invention.

FIG. 1 is a context diagram of a communications system which is suitable for use with the present invention. Referring to FIG. 1, a communications network 10 includes a filter complex (FC) 12, a host target router 14, a network management server 16, a host target node 20, a management server console 18, and remote nodes 22 sending message traffic 24. The communications system 10 also includes a plurality of routers 26-1-26-2 (26-n generally).

The routers 26-n interconnect the filter complex 12, the host target router 14, and the other routers 26-n. The host target router 14 connects to the host target node 20, and the network management server 16 connects to the filter complex 12 and the host target router 14, and also to a network management server console 18. Message traffic 24 travels among the routers 26-n from a source node 22 to a destination node, typically an edge router such as the exemplary host target router 14 serving a user. The host target router 14 and filter complex 12, for purposes of the discussion herein, also include functionality found in routers 26-n for routing message traffic 24, discussed further below.

In operation, message traffic emanates from an originating remote node 22 and travels as a stream of packets, or message traffic 24, according to a particular transport protocol. In the exemplary network shown, such a transport protocol may be the TCP/IP protocol, having message traffic 24 in the form of TCP/IP compliant packets. The message traffic 24 travels from router 26-n to router 26-n according to address information in the message traffic 24 and recognized by the transport protocol.

During normal message traffic 24 routing, all message traffic 24 follows a series of hops determined by the routers 26-n. In the example shown, the message traffic 24 flows to router 26-1, then to router 26-2 as shown by arrow 28-1, then to the host target router 14, as shown by arrow 28-2. As the host target router 14 (target router) is an edge router serving the host target node 20 (target node), message traffic 24 delivery occurs via an Internet gateway link 26, such as a telephone line modem or broadband drop (not shown), to the target node 20.

In the event of an inundation of excessive message traffic 24 to the target node 20, such as a DDOS attack, the target node 20 detects the potentially harmful message traffic 24 and alerts the network management server 16. Alternatively, an automated or manual inspection process triggers such a detection, such as via an operator at the server console 18. In response, the network management server 16 directs the filter complex 12 to receive message traffic 24 directed (addressed) to the target node 20. The network management server 16 also informs the target router 14 that it is no longer the preferred router to access the target node 20. Accordingly, the network 10 redirects the message traffic 24 to the filter complex 12, as shown by arrow 30.

At the filter complex 12, described further below, the message traffic 24 bifurcates into undesirable message traffic 32 and desirable message traffic 34. The filter complex 12 diverts the undesirable message traffic 32 for analysis or discard (i.e. the so called "bit bucket"), and redirects the desirable message traffic 34 to the host target router 14. The filter complex 12 redirects the desirable message traffic 34 by a second communications transport protocol (mechanism), since the management server 16 has already rerouted message traffic sent via the primary, or first, transport protocol (mechanism) from the target node 20 to the filter complex 12. Accordingly, an attempt to transmit message traffic 24 from the filter complex 12 to the target router 14 via the first transport mechanism would result in the message traffic returning to the filter complex 12. The second transport mechanism 34, however, allows the redirected message traffic 34 to travel to the host target router 14 and on to the target node 20 regardless of the reroute in the first transport mechanism.

Figure 2:
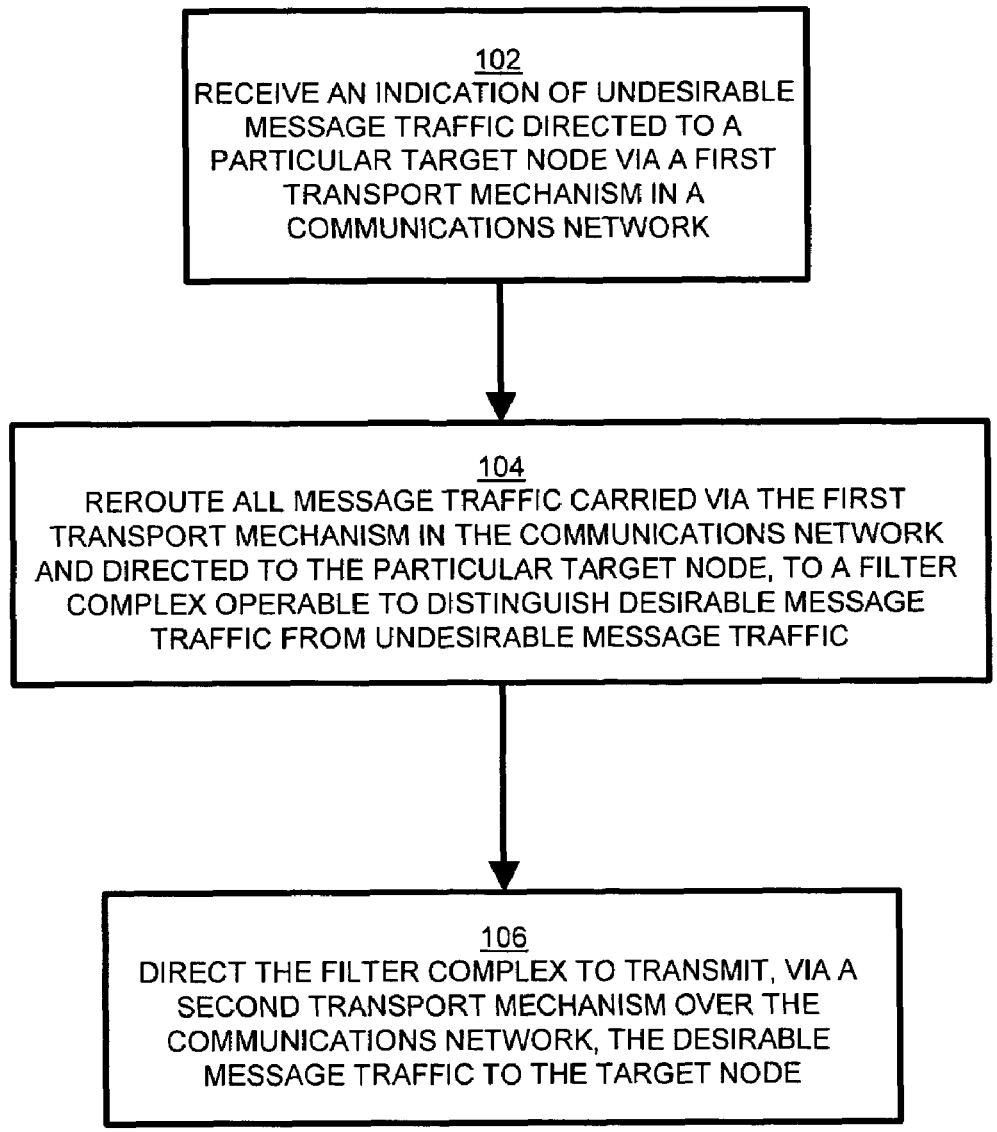
FIG. 2 is a flowchart depicting message traffic rerouting in the network of FIG. 1.

FIG. 2 is a flowchart depicting message traffic 24 rerouting and redirecting in the network of FIGS. 1 and 2. Referring to FIG. 2, the method for redirecting network message traffic 24 in response to a DDOS attack or other rerouting trigger involves, at step 102, receiving an indication of undesirable message traffic 24 directed to a particular target node 20 via the first transport mechanism in the communications network 10. The indication occurs according to a variety of warning triggers. An operator at the target node 20 may observe an influx of message traffic 24 impeding performance, or obstruction via an automated daemon (not shown) or other component executing on the target node 20 may occur. The network management server 16 may also observe a high traffic volume at the target router 14 for routing to the target node 20. Other trigger and/or detection mechanisms may be used.

At step 104, in response to detecting in step 102, the network management server 16 initiates rerouting all message traffic 24 carried via the first transport mechanism in the communications network and directed to the particular target node 20, to the filter complex 12 operable to distinguish desirable message traffic from undesirable message traffic. The rerouting, in the configuration shown in FIG. 1, occurs as a message sent from the network management server 16 to the filter complex 12. Additionally, the network management server 16 sends a second message to the target router 14 to indicate that the target router 14 is no longer the preferred route for the target node 20. The management server 10 therefore designates the filter complex 12 as the edge router for message traffic routing for the target node 20 address. Accordingly, the message traffic 24 follows the reroute path to the filer complex 12, as shown by arrow 30. Both the filter complex 12 and the target router 14 propagate the routing information directing the target node 20 message traffic 24 to the filer complex 12 according to the protocol of the first transport mechanism, which automatically disseminates such routing information to the routing tables at routers 26-*n* across the communications network, described further below. However, the network management server need only transmit the reroute messages to the filter complex 12 and to the target router 14.

At step 106, the network management server 16 sends a message directing the filter complex 12 to transmit, via a second transport mechanism (described further below) over the communications network 10, the desirable message traffic 34 to the target node 20, as shown by arrow 34. Since the desirable, redirected message traffic 34 follows the second transport mechanism, it is unaffected by the routing changes in the first transport mechanism which redirect the target node 20 message traffic 30 to the filter complex 12. At the filter complex 20, undesirable message traffic deviates off on an alternate path, shown by arrow 32, as the filter complex does not send the undesirable message traffic 32 to the target node 20, as will now be described with respect to FIGS. 3 and 4*a*-4*c*.

Figure 3:
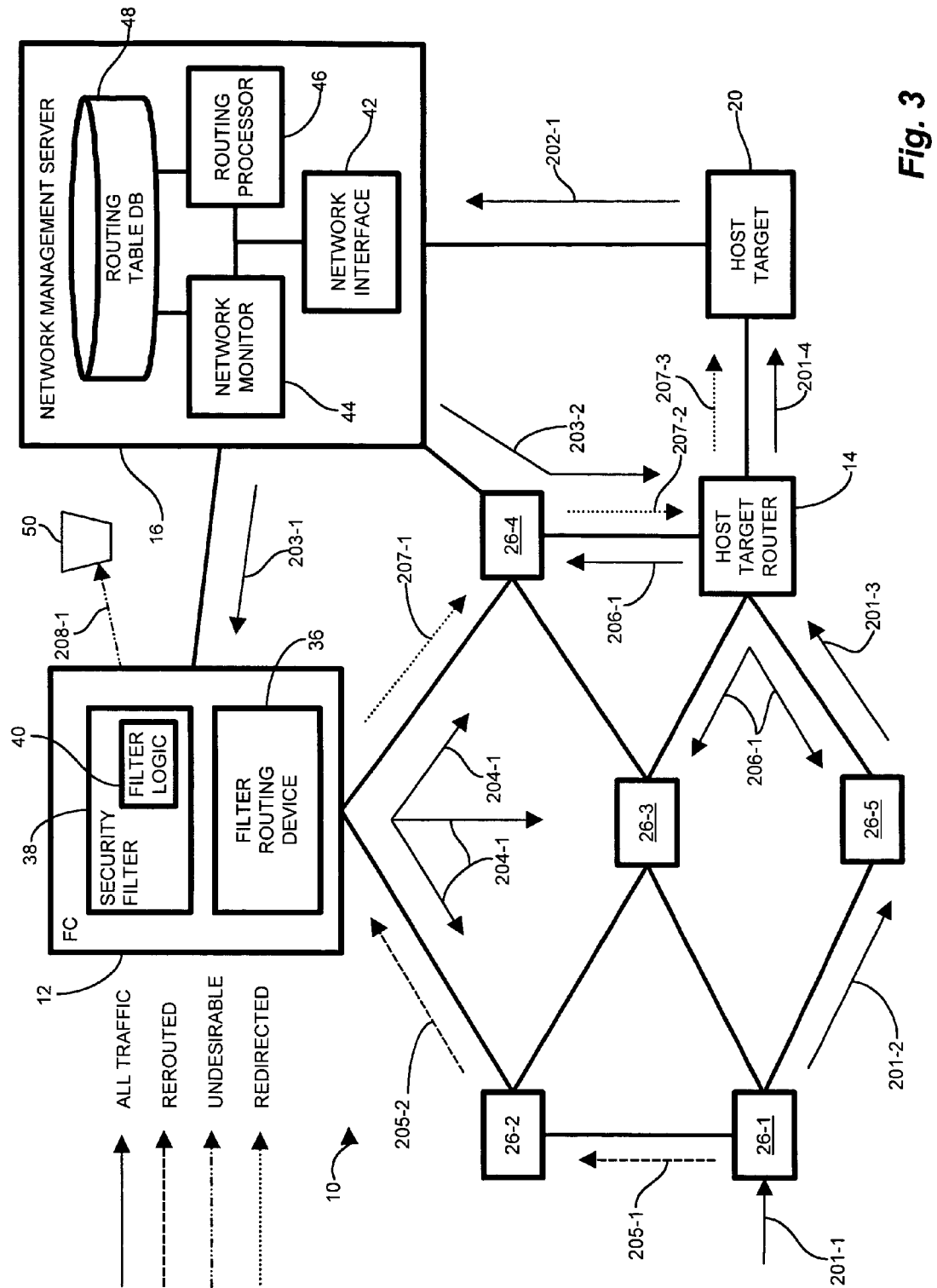
FIG. 3 is a block diagram of a communications network for transmitting message traffic in the system of FIG. 1.

FIG. 3 is a block diagram of a computer communications network 10 for transmitting message traffic 24 in the system of FIG. 1. Referring to FIG. 3, the communications network 10 includes a plurality of routers 26-*n*, including routers 26-1-26-5 shown. Further, the target router 14 has routing capability similar to that of 26-*n*, and the filter complex 12 includes a filter routing device 36 also with similar routing capability. The filter complex 12 also includes a security filter 38 having filter logic 40, and a repository 50 for deleting and/or storing for analysis the undesirable message traffic 34 shown by arrow 208. The network management server 16 includes a network interface 42, a network monitor 44, or daemon, a routing processor 46 and a routing table DB 48.

As indicated above, each of the routers 26-1-26-5 interconnect each other, the target router 14 and the filter routing device 36. Each of the routing devices 26-*n*, 14 and 36 send messages 201-208, described further below with respect to FIGS. 4*a*-4*c*, according to either the first or second transport mechanisms. The filter complex includes the security filter 38, in communication with the filter routing device 36 and operable to distinguish and subdivide the undesirable message traffic 208 from desirable message traffic 207-1. The filter logic 40 in the security filter 36 includes instructions and operations for parsing the incoming message traffic 205-2 to distinguish and bifurcate the undesirable and desirable message traffic. One method for distinguishing undesirable message traffic is disclosed by Riverhead Networks, of Cupertino, Calif. Other mechanisms will be apparent to those skilled in the art regarding such security filters, and include various parsing and token matching procedures and routines for detecting certain known incriminating patterns in the message traffic 205-2.

The network management server 16 enables operator management of the network 10 via the server console 18 (FIG. 1). The network interface 42 couples to the network 10 for receiving and sending routing information to the routing devices 26-*n* and other status information. The network monitor 44 detects and receives indications of message influx and other indications, either automated or via manual inspection, of a need to reroute and redirect traffic via the filter complex 12, such as those corresponding to step 100 above. The routing processor 46 computes and determines messages 200-208 to send in response to detection by the network monitor 44. The routing table DB 48 stores information regarding routing tables in the first and second transport mechanisms, enabling the routing processor to determine which routing devices 26-*n*, 14 and 36 to send rerouting and redirection instructions, as will now be describe in FIGS. 4*a*-4*c*.

Figure 4A:
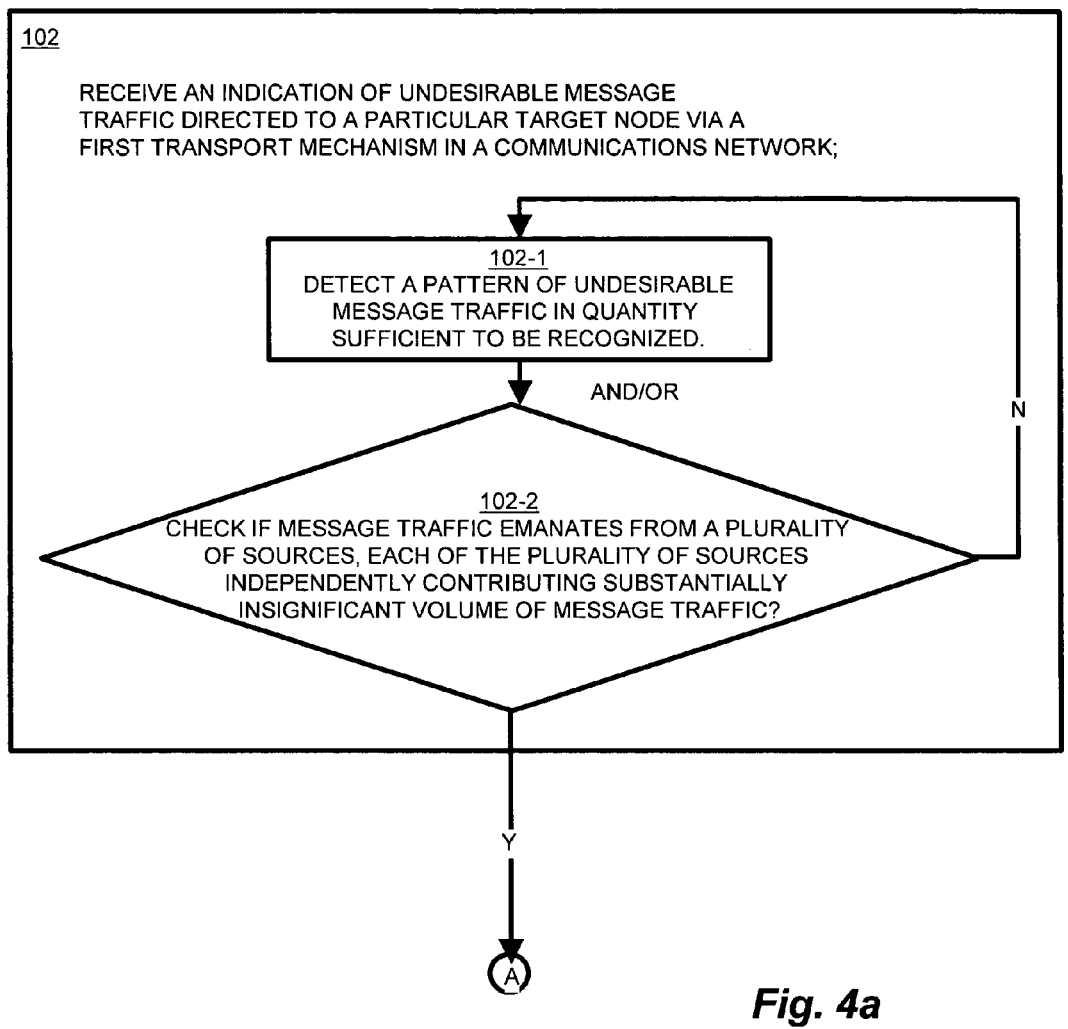
FIGS. 4a-4c are flowcharts depicting message traffic rerouting as in FIG. 2 in greater detail.
Figure 4B:
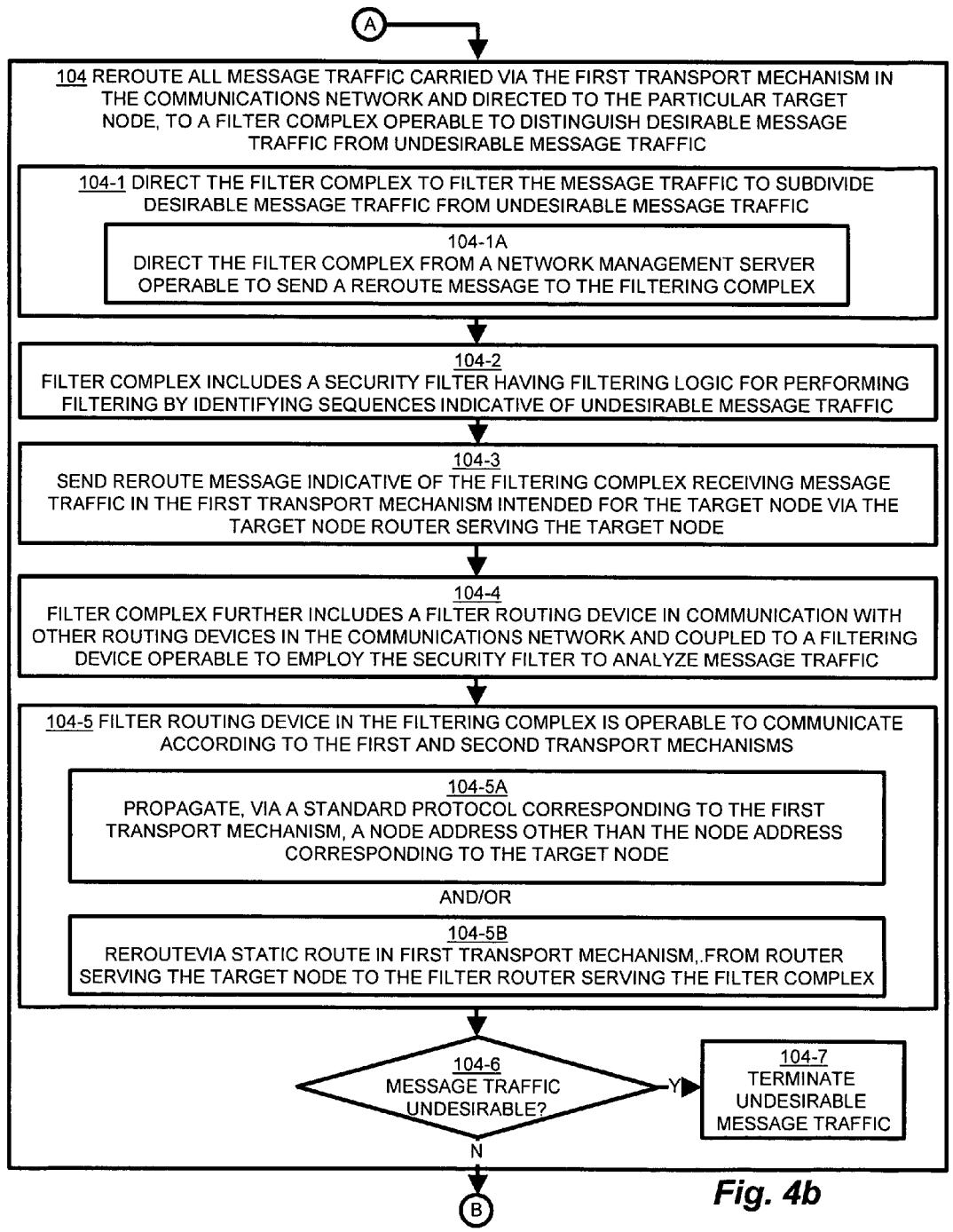
Figure 4C:
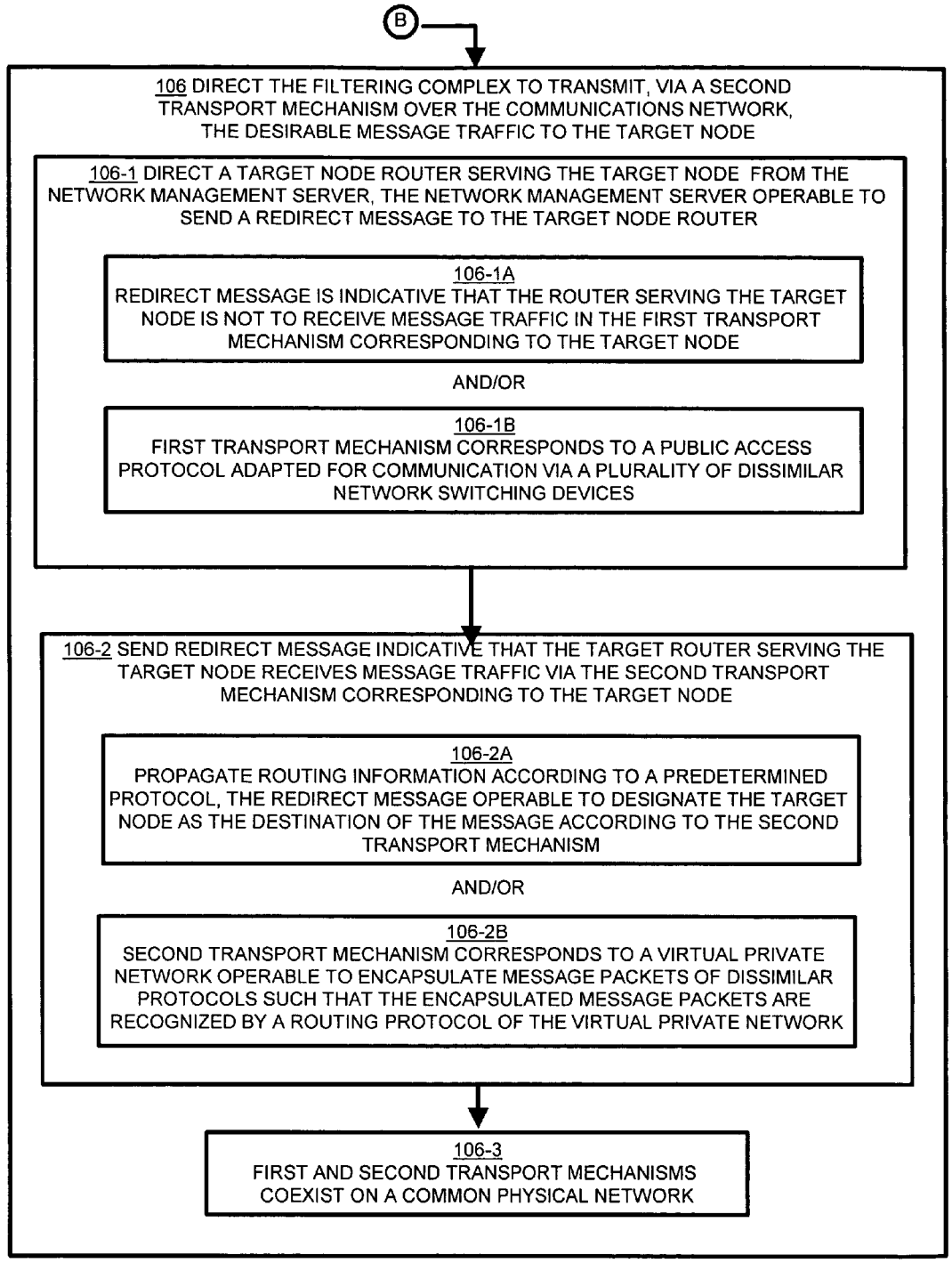

FIGS. 4*a*-4*c* are flowcharts depicting message traffic rerouting as in FIG. 2 in greater detail. Referring to FIGS. 4*a*-4*c*, 1 and 3, at step 102, the network management server 16, receives an indication of undesirable message traffic, as shown by arrow 202-1. At step 102-1, the indication further includes detecting a pattern of undesirable message traffic in quantity sufficient to be recognized. As indicated above, the DDOS attack emanates from a plurality of sources. Detection of an attack involves identifying inundating message traffic from multiple sources, none of which on their own may indicate an abnormal condition. Therefore, a threshold or other indication of an attack or abnormal influx triggers the detection. At step 102-2, a check is performed to determine the existence of undesirable message traffic emanating from a plurality of sources 22, shown by arrow 201-1, even when each of the plurality of sources independently contributing substantially insignificant volume of message traffic. Therefore, a volume of predetermined message throughput load is deemed to be significant enough to trigger the reroute and redirection as disclosed herein.

At step 104, a particular arrangement of rerouting is described in an exemplary manner. Alternate mechanisms operable to perform basing routing functions will be apparent to those skilled in the art, without deviating from the scope of the invention. Accordingly, rerouting to the filter complex 12 further includes, at step 104-1 directing the filtering complex to filter the message traffic 24 to subdivide desirable message traffic 34 from undesirable message traffic 32. At step 104-1A, the rerouting message 203-1 is, in a particular configuration, sent from the network management server 16 in communication with the filtering complex 12, the network management server 16 being operable to send the reroute message 203-1 to the filtering complex 12.

As indicated above, the filter complex 12 further includes the security filter 38 having filtering logic 40 for performing filtering, the security filter 38 operable to parse the message traffic and identify sequences in the message traffic indicative of undesirable message traffic. At step 104-2, the filter complex 12 invokes the security filter 38 to analyze the incoming rerouted message traffic, shown by arrows 205-1 and 205-2, according to the filter logic 40.

At step 104-3, in response to the reroute message 203-1, the filtering complex 20 reroutes and receives message traffic sent according to the first transport mechanism and intended for the target node 20 via the target node router 14 serving the target node. Therefore, the rerouting causes the filter routing device 36 to now receive message traffic 205-1, 205-2 which had originally been addressed to travel to the host target router 14, as shown by arrows 201-1-201-3.

At step 104-4, since the filter complex further 20 includes a filter routing device 36 in communication with other routing devices 26-*n* in the communications network, the filter routing device 36 receives the message traffic and employs the security filter 38 to analyze the message traffic 205-2.

At step 104-5, the filter routing device 36 in the filtering complex 12 is operable to communicate according to the first transport mechanism and the second transport mechanism, and at step 104-5A, rerouting all message traffic further includes propagating, via a standard protocol corresponding to the first transport mechanism, a node address other than the node address corresponding to the target node 20, as shown by arrows 204-1. The first transport mechanism corresponds to a primary routing protocol, such as TCP/IP in a particular configuration, and involves advertising the filter routing device 36 as the preferred route for the target node 20 rather than the target router 14. In addition to or alternatively, at step 104-5B, the network management server 16 establishes a static route, according to the first transport mechanism, from the single target router 14 serving the target node 20 to the filter routing device 36 serving the filter complex 12. Therefore, the filter routing device 36 becomes the preferred router for message traffic 201-1 in the first transport protocol sent to the target node 20. Accordingly, message traffic 201-1 which would have traveled to the target router 14 absent the reroute, as shown by arrows 201-2 and 201-3, is rerouted by router 26-1, as shown by arrow 205-1.

At step 104-6, a check is performed to examine the result of the security filter 38 in filtering the rerouted message traffic 205-1, 205-2. Typically, the message traffic 205-1, 205-2 is a stream of message units or segments upon which the check applies. In a particular arrangement, in which the first transport mechanism corresponds to the TCP/IP protocol, the message traffic 205-2 is a series of message packets. The check at step 104-6 applies on a per packet basis. Therefore, if the message packet is undesirable, the filter complex sends the message packet to a disposal repository 50, such as an analysis file or "bit bucket," as shown by arrow 208-1 and, at step 104-7, terminates the undesirable message traffic.

At step 106, If the message packet is desirable, as determined by the check at step 104-6, the network management server 16 directs the filter complex 12 to transmit, via the second transport mechanism over the communications network 10, the desirable message traffic to the target node 20. At step 106-1, directing the filter complex 12 includes directing the target router 14 serving the target node 20 from the network management server 16, the network management server 16 being 203-2 operable to send a redirect message 203-2 to the target node router 14.

At step 106-1A, the redirect message 103-2 is indicative that the target router 14 (edge router) serving the target node 20 is not to receive message traffic 201-3 in the first transport mechanism corresponding to the target node. Accordingly, the target router 14 advertises, via messages 206-1, that it is not the preferred route to the target node 20. Alternatively, rather than explicit messages 206-1 indicating the change in preferred routers 26-n, the reroute notification of messages 204-1 above, may, in particular embodiments, prevail.

At step 106-1B, in particular arrangements, the first transport mechanism corresponds to a public access protocol adapted for communication via a plurality of dissimilar network switching devices, such as routing devices 26-n, 36 and 14. Such dissimilar network switching devices are nonetheless conversant in the first transport mechanism, such as TCP/IP. Therefore, any TCP compliant device is operable to perform the redirection of step 106.

At step 106-2 the redirect message 203-2 is further indicative that the target node router 14 serving the target node 20 receives message traffic in the second transport mechanism corresponding to the target node 20. This message 103-2 may be sent as one message effectively performing 106-1 and 106-2, or may be sent as multiple messages.

At step 106-2A the redirect message 203-2 propagates routing information according to a predetermined protocol, the routing information operable to designate the target node 20 as the destination of the message according to the second transport mechanism. The second transport mechanism allows the filter router 36 to send the rerouted 205-2, desirable message traffic to the target node, as shown by arrows 207-1, 207-2 and 207-3. The second transport mechanism provides an alternate set of routing tables stored in the routing table DB 48. The network management server 16 determines the redirect message from the target router 14 and the filter routing device 36, and provides that the message traffic 207-1-207-3 in the second transport mechanism follows the route to the target node 20.

At step 106-2B, establishing the redirection according to the second transport mechanism corresponds to a virtual private network operable to encapsulate message packets of dissimilar protocols such that the encapsulated message packets are recognized by a routing protocol of the virtual private network. Therefore, the second transport mechanism defines routing tables and information corresponding to the VPN for message redirection. The desirable message traffic is, in the particular configuration shown, rerouted to the filter complex 12 by the TCP/IP reroute according to the first transport mechanism, and redirected to the target node 20 by the VPN according to the second transport mechanism.

At step 106-3 therefore, directing and rerouting occur via messages in which the first and second transport mechanisms coexist on a common physical network 10. Therefore, the same physical network 10, such as a public access network including the Internet, has physical lines which carry the message traffic according to both the first transport mechanism and the second transport mechanism. The routers 26-n employ parallel sets of routing tables corresponding to the Internet and VPN, respectively, and determine and lookup routing hops according to the transport mechanism by which a particular message packet travels. Further, the routing devices 26-n, 36, and 14 employ routing operable in at least the first transport mechanism and the second transport mechanism. Such operation is available, by way of example only, in the MPLS (Multi-Protocol Layer Service) conversant routing devices referenced above. In conjunction with the invention, the second transport mechanism operates as an MPLS shunt, using a predefined or dynamic Virtual Routing or Forwarding (VRF) table, to reach the target node.

Figure 5:
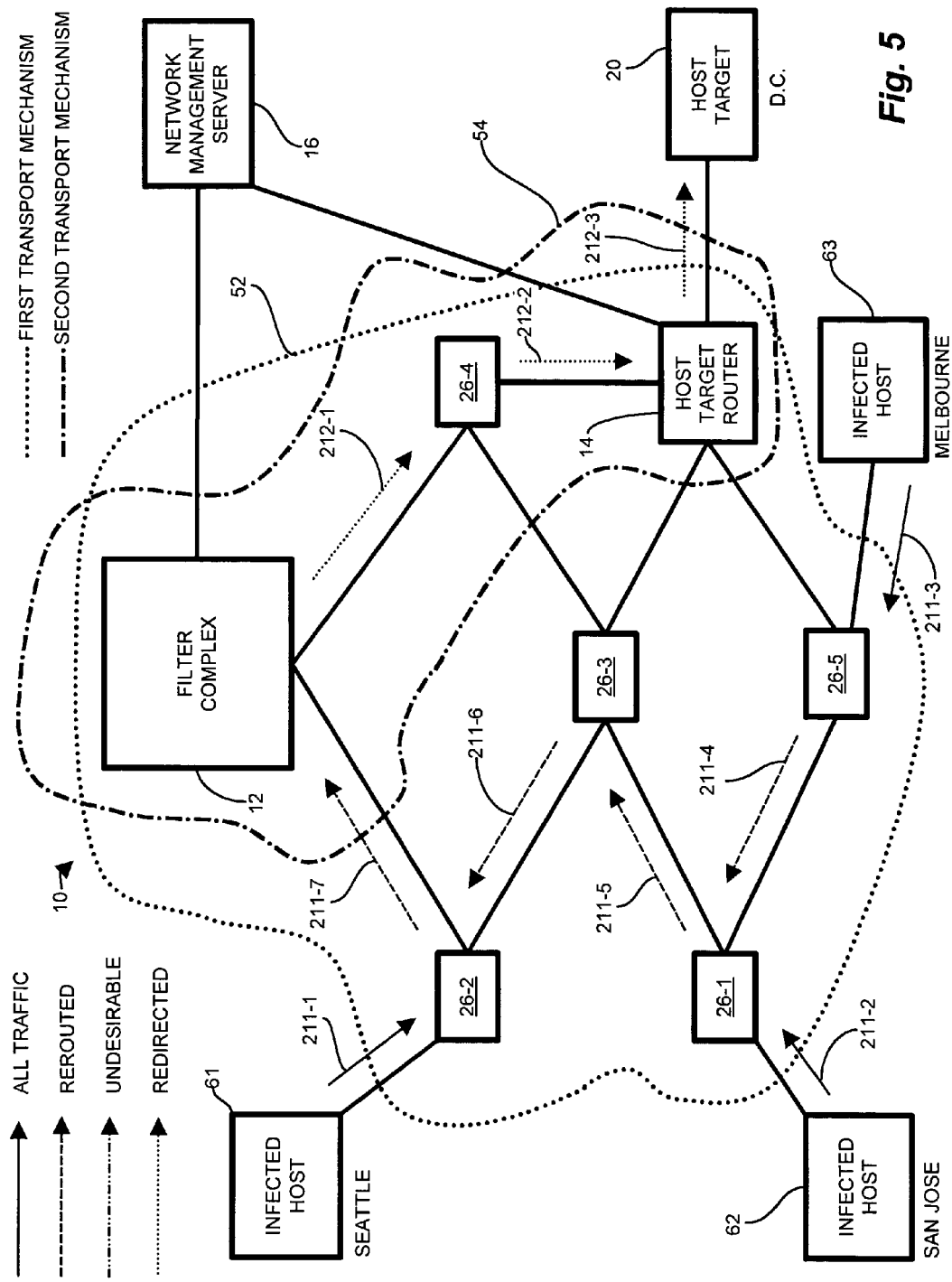
FIG. 5 is an example of a Virtual Private Network (VPN) transmitting redirected message traffic in the communications network of FIG. 3.

FIG. 5 is an example of a Virtual Private Network (VPN) transmitting redirected message traffic in the communications network of FIG. 3. In the computer network 10, several sights have become infected with a virus for propagating a DDOS attack. Three sights: Seattle 61, San Jose 62 and Melbourne 63 transmit message traffic to the host target 20. Suppose further that the target host 20 is in Washington, D.C. The message traffic emanating from these sites follows the path shown by the arrows 211-1-211-7 to the filter complex, all via the first transport mechanism 52. As the sights are all distributed across the U.S., the illustrated number of routers 26-n is exemplary; many more routers 26-n would be used for routing of such distributed hosts 61-63. The network management server 16 directs the message traffic 211-n to the filter complex 12 via the first transport mechanism 52. The filter complex 12, router 26-4, and the target router 14 are all conversant in both the first transport mechanism 52 and the second transport mechanism 54. As can be seen by FIG. 5, the first and second transport mechanism 52, 54 may be illustrated as overlays on the same physical routing devices 26-n, 12 and 14.

The filter complex 12, after filtering the undesirable message traffic as described above, redirects the desirable message traffic via router 26-4 to the target router 14 via the VPN corresponding to the second transport mechanism 54. In this manner, the VPN denoting the second transport mechanism 54 operates as an alternate (VRF) providing a second virtual path from the filter complex 12 to the target node 20.

The exemplary first and second transport mechanisms discussed above correspond to, in a particular configuration, to a TCP/IP protocol on the Internet on a VPN, respectively. It should be understood that the system and methods disclosed herein are applicable to a plurality of transport mechanisms, including alternate protocols, transmission lines, and virtual facilities/overlay schemes.

The first and second transport mechanisms 52, 54, in particular, configuration disclosed above, propagate routing information according to a routing table mechanism, as is known to those skilled in the art. Such a routing table matches an IP address with a destination along each hop through the network. The first and second transport mechanisms, in a particular arrangement, reference separate sets of routing tables. Alternate data structures and lookup methods to distinguish and separate the logic deterministic of the routing operations will be apparent to those skilled in the art without deviating from the scope of the claimed invention.

Further, the rerouting and redirection of undesirable message traffic is disclosed above in an exemplary manner in terms of defending against a distributed denial of service (DDOS) attack. The operations and methods discussed above are, in alternate configurations, applicable to a variety of other circumstances as well. For example, such rerouting and filtering is applicable to detecting and eliminating transmissions such as email SPAM or so-called "push" medium pop-up windows. Other uses can be envisioned.

The operations and functions disclosed above for rerouting and redirecting undesirable message traffic are described, by way of example only, as initiating from an operator console of a network management server, such as an SNMP console. The operations and functions claimed herein my also be performed in the routing devices themselves, such as in the filter complex or in the target routing devices. Further, such operations may be initiated manually, by operator inspection, or automatically by a watchdog daemon in the network monitor or other monitoring component. The above described arrangement is not meant to be limiting of the invention; the invention claimed herein is intended to be limited only by the following claims.

Those skilled in the art should readily appreciate that the programs and methods for network message traffic redirection as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for network message traffic redirection has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for redirecting network message traffic comprising:

receiving an indication of undesirable message traffic directed to a particular target node via a first transport mechanism in a communications network;

rerouting all message traffic carried via the first transport mechanism in the communications network, and directed to the particular target node, to a filter complex operable to distinguish desirable message traffic from undesirable message traffic, rerouting all message traffic including directing the filter complex from a network management server in communication with the filter complex, the network management server operable to send a reroute message to the filter complex;

establishing a second transport mechanism having a separate set of routing tables in an overlay arrangement with the first transport mechanism under which the rerouting to the filter complex occurs; and directing the filter complex to transmit, via the second transport mechanism over the communications network, the desirable message traffic to the target node, directing the filter complex further comprising propagating routing information according to a predetermined protocol, the routing information operable to designate the target node as the destination of the message according to the second transport mechanism, the second transport mechanism defining a Virtual Private Network (VPN) protocol.

2. The method of claim 1 further comprising directing the filter complex to filter the message traffic to subdivide desirable message traffic from undesirable message traffic.

3. The method of claim 1 wherein the filter complex further comprises a security filter having filtering logic for performing filtering, the security filter operable to parse the message traffic and identify sequences in the message traffic indicative of undesirable message traffic.

4. The method of claim 3 wherein the filter complex further includes a filter routing device in communication with other routing devices in the communications network and coupled to the security filter for analyzing message traffic.

5. The method of claim 4 wherein the filter routing device in the filter complex is operable to communicate according to the first transport mechanism and the second transport mechanism.

6. The method of claim 1 wherein directing further comprises directing a target node router serving the target node from the network management server, the network management server operable to send a redirect message to the target node router.

7. The method of claim 1 wherein the reroute message is indicative of the filter complex receiving message traffic according to the first transport mechanism intended for the target node via the target node router serving the target node.

8. The method of claim 6 wherein the redirect message is indicative that the target router serving the target node is not to receive message traffic according to the first transport mechanism corresponding to the target node.

9. The method of claim 6 wherein the redirect message is indicative that the target node router serving the target node receives the desirable message traffic in the second transport mechanism corresponding to the target node.

10. The method of claim 1 wherein first and second transport mechanisms coexist on a common physical network.

11. The method of claim 1 wherein first transport mechanism corresponds to a public access protocol adapted for communication via a plurality of dissimilar network switching devices.

12. The method of claim 1 wherein the second transport mechanism corresponds to a virtual private network operable to encapsulate message packets of dissimilar protocols such that the encapsulated message packets are recognized by a routing protocol of the virtual private network.

13. The method of claim 1 wherein rerouting all message traffic is a static route, according to the first transport mechanism, from a single router serving the target node to the filter router serving the filter complex.

14. The method of claim 1 wherein receiving an indication further comprises detecting a recognizable pattern of inundating undesirable message traffic.

15. The method of claim 1 wherein the undesirable message traffic emanates from a plurality of sources, each of the plurality of sources independently contributing substantially insignificant volume of message traffic.

16. A network management server for redirecting undesirable message traffic comprising:
a network intrusion detector monitor operable to receive an indication of undesirable message traffic directed to a particular target node via a first transport mechanism in a communications network;
a routing processor operable to propagate routing information from a routing table database to reroute all message traffic using the first transport mechanism directed to the particular target node; and
a connection to a filter complex responsive to the routing processor, the filter complex operable to distinguish desirable message traffic from undesirable message traffic, and further operable to transmit, by redirecting the desirable message traffic via a second transport mechanism over the communications network, the desirable message traffic to the target node, the redirecting thus transporting a particular message in the desirable message traffic via both the first transport mechanism and the second transport mechanism;
the filter complex operable to reroute all message traffic including propagating, via a standard protocol corresponding to the first transport mechanism, a node address other than the node address corresponding to the target node,
the routing processor operable to direct the filter complex to propagate routing information according to a predetermined protocol, the routing information operable to designate the target node as the destination of the message according to the second transport mechanism, the second transport mechanism having a separate set of routing tables in an overlay arrangement with the first transport mechanism under which the rerouting to the filter complex occurs,
the second transport mechanism defining a Virtual Private Network (VPN) protocol,
the network management server further operable to send a reroute message to the filter complex, in response to which the filter complex is operable to reroute the message traffic, the reroute message indicative of the filter complex receiving message traffic according to the first transport mechanism intended for the target node via a target node router serving the target node.

17. The network management server of claim 16 wherein the filter complex is further operable to filter the message traffic to subdivide the desirable message traffic from the undesirable message traffic.

18. The network management server of claim 16 wherein the filter complex further comprises a security filter having filtering logic for performing filtering, the security filter operable to parse the message traffic and identify sequences in the message traffic indicative of undesirable message traffic.

19. The network management server of claim 18 wherein the filter complex further includes a filter routing device in communication with other routing devices in the communications network and coupled to the security filter to analyze message traffic.

20. The network management server of claim 19 wherein the filter routing device in the filter complex is operable to communicate according to the first transport mechanism and the second transport mechanism.

21. The network management server of claim 16 wherein the routing processor is further operable to direct a target node router serving the target node from the network management server, the network management server operable to send a redirect message to the target node router.

22. The network management server claim 21 wherein the routing processor is further operable to send a redirect message indicative that the target router serving the target node is not to receive message traffic according to the first transport mechanism corresponding to the target node.

23. The network management server claim 21 wherein the redirect message from the routing processor is further indicative that the target node router serving the target node receives the desirable message traffic in the second transport mechanism corresponding to the target node.

24. The network management server of claim 16 wherein a network interface in the network management server is compatible with the first and second transport mechanisms and wherein first and second transport mechanisms coexist on a common physical network.

25. The network management server of claim 16 wherein first transport mechanism is operable according to a public access protocol adapted for communication via a plurality of dissimilar network switching devices.

26. The network management server of claim 16 wherein the second transport mechanism is operable according to a virtual private network protocol operable to encapsulate message packets of dissimilar protocols such that the encapsulated message packets are recognized by a routing protocol of the virtual private network.

27. The network management server of claim 16 wherein the filter complex is operable to reroute all message traffic including propagating, via a standard protocol corresponding to the first transport mechanism, a node address other than the node address corresponding to the target node.

28. The network management server of claim 16 wherein the routing processor is operable to direct the filter complex to propagate routing information according to a predetermined protocol, the routing information operable to designate the target node as the destination of the message according to the second transport mechanism.

29. The network management server of claim 16 wherein the routing processor is operable to rerouting the message traffic according to a static route in the first transport mechanism, from a single router serving the target node to the filter router serving the filter complex.

30. The network management server of claim 16 wherein the undesirable message traffic emanates from a plurality of sources, each of the plurality of sources independently contributing substantially insignificant volume of message traffic.

31. The method of claim 16 wherein the first and second transport mechanisms are first and second protocols, the first protocol and the second protocols being different protocols recognized in a Multi-Protocol Layer Service (MPLS) network.

32. In a network management server of a networked system of data communications devices, a method for transparently intercepting, filtering, and rerouting message traffic for recovering from a distributed denial of service attack comprising:

detecting, at a network monitor in the network management server, a pattern of inundating undesirable message traffic to a particular target node transported via a first transport mechanism in a communications network;

receiving, via a routing processor, an indication of the undesirable message traffic directed to the particular target node;

transmitting, via a network interface, a reroute message to a filter complex having a security filter operable to distinguish desirable message traffic from undesirable message traffic; and rerouting, via a filter routing device in the filter complex, all message traffic carried via the first transport mechanism in the communications network and directed to the particular target node, rerouting all message traffic including directing the filter complex from a network management server in communication with the filter complex, the network management server operable to send a reroute message to the filter complex, the reroute message indicative of the filter complex receiving message traffic according to the first transport mechanism intended for the target node via a target node router serving the target node;

establishing a second transport mechanism, the second transport mechanism having a separate set of routing tables in an overlay arrangement with the first transport mechanism under which the rerouting to the filter complex occurs;

filtering, at the security filter, the message traffic to bifurcate desirable message traffic from undesirable message traffic;

transmitting, via the network interface to a target node router serving the target node, a redirect message indicating that the target node router is to receive, via the second transport mechanism, the desirable message traffic directed to the particular target node and rerouted to the filter complex, the filter complex and the target node router conversant in the first transport mechanism and the second transport mechanism, the second transport mechanism defining a Virtual Private Network (VPN) protocol; and directing, from the network management server, the filter complex to transmit, via the second transport mechanism over the communications network, the desirable message traffic to the target node, directing the filter complex further comprising propagating routing information according to a predetermined protocol, the routing information operable to designate the target node as the destination of the message according to the second transport mechanism.

33. A computer program product having an encoded set of processor based instructions on a computer readable storage medium operable to store computer program logic embodied in computer program code encoded thereon for directing a processor to perform steps for redirecting network message traffic comprising:

computer program code to receive an indication of undesirable message traffic directed to a particular target node via a first transport mechanism in a communications network;

computer program code to reroute all message traffic carried via the first transport mechanism in the communications network and directed to the particular target node, to a filter complex operable to distinguish desirable message traffic from undesirable message traffic, rerouting all message traffic further comprising propagating, via a standard protocol corresponding to the first transport mechanism, a node address other than the node address corresponding to the target node, rerouting all message traffic including directing the filter complex from a network management server in communication with the filter complex, the network management server operable to send a reroute message to the filter complex, the reroute message indicative of the filter complex receiving message traffic according to the first transport mechanism intended for the target node via a target node router serving the target node;

computer program code to establish a second transport mechanism having a separate set of routing tables in an overlay arrangement with the first transport mechanism under which the rerouting to the filter complex occurs; and computer program code to direct the filter complex to transmit, by redirecting the desirable message traffic via the second transport mechanism over the communications network, the desirable message traffic to the target node, the redirecting thus transporting a particular message in the desirable message traffic via both the first transport mechanism and the second transport mechanism, directing the filter complex further comprising propagating routing information according to a predetermined protocol, the routing information operable to designate the target node as the destination of the message according to the second transport mechanism, the second transport mechanism defining a Virtual Private Network (VPN) protocol.

34. A network management server for redirecting undesirable message traffic comprising:

means for receiving an indication of undesirable message traffic directed to a particular target node via a first transport mechanism in a communications network;

means for rerouting all message traffic carried via the first transport mechanism in the communications network and directed to the particular target node, to a filter complex operable to distinguish desirable message traffic from undesirable message traffic, rerouting all message traffic including directing the filter complex from a network management server in communication with the filter complex, the network management server operable to send a reroute message to the filter complex, the reroute message indicative of the filter complex receiving message traffic according to the first transport mechanism intended for the target node via a target node router serving the target node;

means for establishing a second transport mechanism having a separate set of routing tables in an overlay arrangement with the first transport mechanism under which the rerouting to the filter complex occurs; and means for directing the filter complex to transmit, by redirecting the desirable message traffic via the second transport mechanism over the communications network, the desirable message traffic to the target node, the redirecting thus transporting a particular message in the desireable message traffic via both the first transport mechanism and the second transport mechanism, the second transport mechanism corresponding to a virtual private network operable to encapsulate message packets of dissimilar protocols such that the encapsulated message packets are recognized by a routing protocol of the virtual private network, the second transport mechanism defining a Virtual Private Network (VPN) protocol.

35. A method of redirecting an inundation of undesirable message traffic in a computer network comprising:

establishing, in the computer network, a first protocol for routing message traffic in the computer network;

establishing, in the computer network, a second protocol specific to a virtual private network (VPN), the second protocol having a separate set of routing tables in an overlay arrangement with the first protocol, the second protocol having transport ability between at least a filter complex, a target node, and a target node router, the target node router included in a routing path to the target node, the target node router in communication with the target node via both the first protocol and the second protocol and operable to deliver the message traffic to the target node via either the first protocol and the second protocol;

identifying an indication of undesirable message traffic directed to the target node via the first protocol in the computer network;

propagating routing information according to the first protocol, the routing information operable for redirecting a message in the message traffic by designating the filter complex in the routing path to the target node via routing in the first protocol; and sending a reroute message to the filter complex, the reroute message operable to designate the target node as the destination of the message according to the second protocol, redirecting including sending instructions to the target node router coupled to the target node, the instructions designating the target node router as a destination router for the target node according to the second protocol, the redirecting thus transporting the message via both the first protocol and the second protocol.

36. The method of claim 35 wherein the first protocol and the second protocol being different protocols recognized in a Multi-Protocol Layer Service (MPLS) network.

* * * * *